US011550970B2

(12) United States Patent
Nair et al.

(10) Patent No.: US 11,550,970 B2
(45) Date of Patent: Jan. 10, 2023

(54) RESOLVING OPAQUENESS OF COMPLEX MACHINE LEARNING APPLICATIONS

(71) Applicant: Wells Fargo Bank, N.A., San Francisco, CA (US)

(72) Inventors: Vijayan N. Nair, Matthews, NC (US); Agus Sudjianto, Charlotte, NC (US); Jie Chen, Fremont, CA (US); Kurt Schieding, Charlotte, NC (US); Linwei Hu, Charlotte, NC (US); Xiaoyu Liu, Newark, CA (US); Joel Vaughan, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1063 days.

(21) Appl. No.: 16/179,073

(22) Filed: Nov. 2, 2018

(65) Prior Publication Data
US 2020/0143005 A1 May 7, 2020

(51) Int. Cl.
*G06N 20/00* (2019.01)
*G06F 30/20* (2020.01)
*G06F 16/22* (2019.01)
*G06F 111/10* (2020.01)

(52) U.S. Cl.
CPC ......... *G06F 30/20* (2020.01); *G06F 16/2246* (2019.01); *G06F 16/2272* (2019.01); *G06F 2111/10* (2020.01); *G06N 20/00* (2019.01)

(58) Field of Classification Search
CPC .. G06F 30/20; G06F 16/2246; G06F 16/2272; G06F 2111/10; G06F 16/9027; G06F 16/285; G06N 20/00; G06N 3/08; G06N 5/045
See application file for complete search history.

(56) References Cited

U.S. PATENT DOCUMENTS

| 2017/0364803 | A1* | 12/2017 | Calmon | G06N 3/0454 |
| 2018/0018553 | A1* | 1/2018 | Bach | G06V 10/454 |
| 2018/0018590 | A1* | 1/2018 | Szeto | G06N 20/10 |
| 2018/0158552 | A1* | 6/2018 | Liu | G16H 50/70 |

(Continued)

OTHER PUBLICATIONS

Hu et al.—"Locally Interpretable Models and Effects based on Supervised Partitioning (LIME-SUP)"—https://arxiv.org/ftp/arxiv/papers/1806/1806.00663.pdf (Year: 2018).*

(Continued)

*Primary Examiner* — Viker A Lamardo
(74) *Attorney, Agent, or Firm* — Womble Bond Dickinson (US) LLP

(57) ABSTRACT

Computing systems and technical methods that transform data structures and pierce opacity difficulties associated with complex machine learning modules are disclosed. Advances include a framework and techniques that include: i) global diagnostics; ii) locally interpretable models LIME-SUP-R and LIME-SUP-D; and iii) explainable neural networks. Advances also include integrating LIME-SUP-R and LIME-SUP-D approaches that create a transformed data structure and replicated modeling over local and global effects and that yield high interpretability along with high accuracy of the replicated complex machine learning modules that make up a machine learning application.

18 Claims, 5 Drawing Sheets

(56) References Cited

U.S. PATENT DOCUMENTS

2019/0156216 A1\* 5/2019 Gupta .................... G06N 20/00
2021/0358579 A1\* 11/2021 Chen ..................... G06N 5/045

OTHER PUBLICATIONS

Goldstein et al., "Peeking Inside the Black Box: Visualizing Statistical Learning With Plots of Individual Conditional Expectation", Journal of Computational and Graphical Statistics, vol. 24, Mar. 21, 2014, pp. 1-22.

Hall et al., "Using H2O Driverless AI", Available Online at <http://docs.h2o.ai>, Version 1.0.24, Mar. 2018, 77 pages.

Ribeiro et al., ""Why Should I Trust You?", Explaining the Predictions of Any Classifier", KDD '16: Proceedings of the 22nd ACM SIGKDD International Conference on Knowledge Discovery and Data Mining, Aug. 2016, 10 pages.

Zhang et al., "Learning a Deep Embedding Model for Zero-Shot Learning", IEEE Conference on Computer Vision and Pattern Recognition (CVPR), Nov. 2016, pp. 2021-2030.

\* cited by examiner

RESOLVING OPAQUENESS OF COMPLEX MACHINE LEARNING APPLICATIONS

BACKGROUND

Computer systems are often analogized to biologic systems. Even the World Wide Web is taken from the biological analogy of a spider connecting different points together with its gossamer web. Innovation has striven to create artificial intelligence, and analogized that intelligence to a human brain. Machine learning has been called an application of artificial intelligence that provides an electronic computing system the ability to automatically learn and improve from experience without being explicitly programmed. Thus, the term "application" is used in a context to indicate that the innovation is directed to more than math, but to a technical application that provides improved computing systems. Aside from any such use of literary analogies, computing systems are not biologic (or living) and are not living in the sense that humans are. Computing systems are not abstract, but are real—and deal with real machines and systems. Machine learning concerns computing solely in a technical environment to which problem situations are structured through models. The data structures associated with machine learning are distinct from the manner in which a human thinks, and the processing of data structures associated with machine learning is not an exercise in abstract thinking, nor divorceable from the technical environment.

Further, and often, machine learning systems must deal with data at volumes and speeds that the term "mere automation" does not apply in the sense that a machine is merely doing that which a human may do (this is commonly referred to as "Big Data"). As Big Data has become more usual in technical efforts, traditional techniques that may seek to apply simple statistical methods have encountered limitations in the art. Machine learning applications provide some means to overcome limitations with flexibility of modeling and creating data structures to reflect that modeling. It is to be appreciated that improvements in analysis, predictive performance, augmented feature engineering of technical systems may be advanced with fast and efficient machine learning techniques. Not only has machine learning applications proliferated, the complexity of machine learning applications also proliferates, creating issues with input to output traceability. The growing complexity and difficulty to understand, follow or interpret computing results leads to an opaqueness associated with such technical tools. The framework and techniques of the present innovation disclosed in this application aim at resolving or alleviating the opaqueness issue. The technical reality does not limit the usefulness of referring to computing systems with anthropic terms, especially discussing systems involved with machine learning and improvements to machine learning systems which may include (but not be limited to) actions that computers may long been incident to, such as the individual elements that courts have indicated to be abstract ideas. Ordered combinations of individual elements provide innovation that merits patent protection. In that light, even though machines and systems of machines, and critically, innovations concerned with machines and systems of machines are often much more easily grasped and understood when anthropic terms are used, terms like "learning," "predicting," "determining" and the like are to be understood in their technical sense in this application.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

It is to be appreciated that piercing the opacity of complex machine learning applications is an issue entirely within a technical computing environment. Merely automating attempts to pierce opacity that may exist either by hand or by pencil and paper are not possible. No consistent systematic manner of doing this exists, so even the "mere automating" of these tasks may have been considered unapproachable outside of a technical computing environment. With this innovation, augmentation beyond mere automation includes creating components for a system whose functionality is currently not captured in most any manual process. In an embodiment, a computing system that pierces a black box effect of a complex machine learning application (or module) may be comprised of a replicator module, a translator module and a graphical user interface. The replicator module may employ local and/or global effect modeling on a plurality of machine learning modules that include at least one complex machine learning module. The local and/or global effect modeling communicates with a library of interpretable machine learning modules to create a replicated semi-additive index data structure. The translator module may generate explanatory mapping of inputs to the plurality of machine learning modules to results of the plurality of machine learning modules that include the black box effect of the at least one complex machine learning module. The graphical user interface may render selected characteristics of the data structure related to the explanatory mapping.

In another embodiment, a non-transitory computer-readable medium configured to store instructions, that when executed by a processor, perform operations including one or more of the system and method steps.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
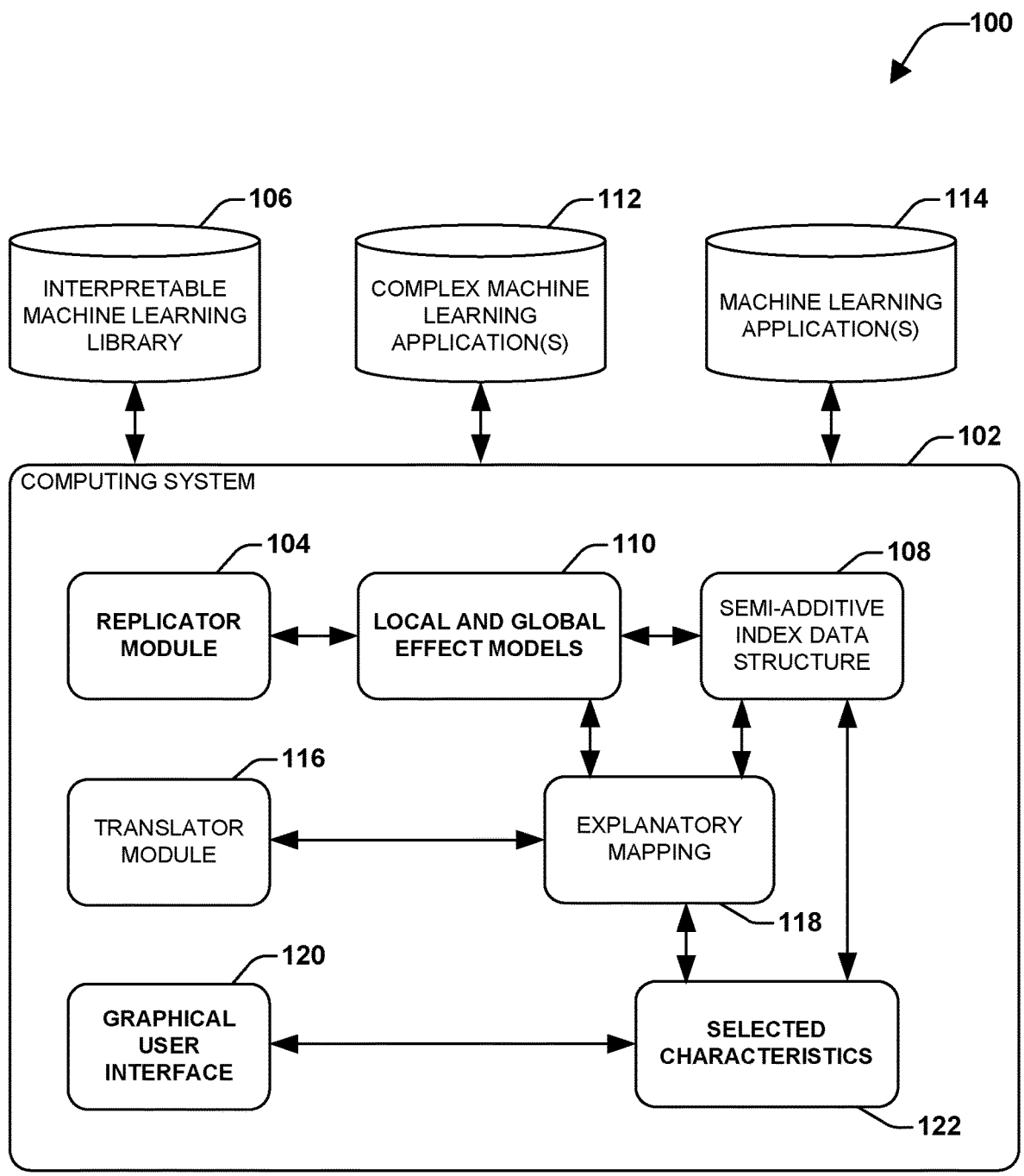
FIG. 1 is an illustration of an example system that resolves opaqueness of complex machine learning applications in context with one or more aspects of the disclosure.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or any combination thereof to control a computer to implement the disclosed subject matter. The term "article of manufacture" as used herein is intended to encompass a computer program accessible from most any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The disclosed innovation is contemplated to be provided in other implementations (for example, as a dedicated hardware ASICS), although not shown.

With reference now to the figures, FIG. 1, illustrated is a system 100 that indicates a technical context in which the innovation is placed. Technical context is also disclosed in relation to FIGS. 4 and 5, which will be discussed later. System 100 may comprise a computing system 102. It is to be appreciated that computing system 102 may be connected to a network (not shown) or otherwise connecting to other computing systems (not shown). It is to be appreciated that such connections are not shown in order to simplify the disclosure of the innovation. Computing system 102 may include a replicator module 104. Replicator module 104 may communicate with a library of interpretable machine learning modules 106 (also discussed as interpretable machine learning library 106) comprising a plurality of modules or models in order to create a replicated semi-additive index data structure 108, as will be discussed herein.

It is to be appreciated that some embodiments may refer to the created structure as an additive index data structures for simplicity, but the data structures created by the innovation perform in situations wherein a pure additive index data structure may not perform, and thus should be considered semi-additive even when referred to in simpler terms. Replicator module 104 may employs local and/or global effect modeling or models 110 (as will be discussed later) on a plurality of machine learning modules 112/114. It is to be appreciated that the plurality of machine learning modules 112/114 may comprise at least one of a complex machine learning application 112 and a plurality of machine learning applications 114.

It is further to be appreciated that complex machine learning applications, as is known in the art, have undesirable black box effects, also known as opacity issues. These black box effects can and often do create technical issues in the application of machine learning when being used to solve technical problems. With Big Data, computing can no longer be considered "just using a machine" and opacity issues may become critical. While machine learning advances have accelerated innovation in computing systems, opacity remains a technical issue inhibiting technical improvements from being deployed. As will be discussed later, local and global effect modeling 110, by replicator module 104, may employ at least an integrated approach of Locally Interpretable Models and Effects based on Supervised Partitioning (fitted response) "LIME-SUP-R" and Locally Interpretable Models and Effects based on Supervised Partitioning (derivatives of fitted response) "LIME-SUP-D" (not shown). As discussed herein, replicator module 104 replicates complex machine learning applications, but does so in a manner that is agnostic to the complex machine learning applications, thereby piercing opacity and alleviating black box effects.

Computing system 102 may also include a translator module 116. Translator module 116 may generate explanatory mapping 118 of inputs to the plurality of machine learning modules (or applications) 112/114 to a plurality of results of the plurality of machine learning modules (or applications) 112/114 that include the black box effect of the at least one complex machine learning module 112. Embodiments of translator module 116 will be discussed herein. Computing system 102 may also include a graphical user interface 120. Graphical user interface 120 may render selected characteristics 122 of a data structure related to an explanatory mapping 118. It is to be appreciated that a replicated semi-additive index data structure may comprise at least transformed data structures related to the library of interpretable machine learning modules 106.

Computing system 102, in an embodiment, may have translator module 116 generate a score. The generated score may indicate a match status to an at least one complex machine learning module 112 that may present an opacity concern or black box effect. As will be discussed herein, embodiments of the innovation may use a generated score to rank disparity, and may generate such based at least in part on prime and derivative results of a replicated semi-additive index data structure. In embodiments, a computing system 102 may render the generated score rendered by a graphical user interface, such as graphical user interface 120. In an embodiment, a rendered generated score identifies at least a complex machine learning module, such as complex machine learning module 112.

In embodiments, graphical user interface 120 may render at least a subset of visual representations of a data structure 108 related to an explanatory mapping 118. As will be discussed herein, at least a subset of visual representations may comprise at least one of an accumulated total derivative effects "ATDEV" plot and a heat map.

It is to be appreciated that piercing the opacity of complex machine learning applications is an issue entirely within a technical computing environment. Merely automating attempts to pierce opacity that may exist either by hand or by pencil and paper are not possible. No consistent systematic manner of doing this exists, so even the "mere automating" of these tasks may have been considered unapproachable outside of a technical computing environment. With this innovation, augmentation beyond mere automation, or functionality of a 'general purpose computer,' includes creating components for a system whose functionality is currently not captured in any manual process.

In an aspect, the disclosed innovation provides as output a configured data structure that provides replication of complex machine learning applications and also provides interpretability unmatched by the prior art. It is to be appreciated that the term "fitting" may be used interchangeably with "providing replication."

As may be common in Big Data or machine learning applications, various inputs (and input structures) may exhibit characteristics of sparsity and high cardinality, which may limit the usefulness of a subset of methodologies and algorithms. The present innovation, through the use of the various components, augments and provides replication with machine learning that is not limited by such concerns and provide substantially more than past methodologies. Additionally, another area in which the components working together can be differentiated from "mere automation" (and from the functionality of a 'general purpose computer') is in the resolution that compensates for e issues such as multicollinearity. It is to be appreciated that the disclosed innovation increases the efficacy of a transformed resultant structure.

Figure 2:
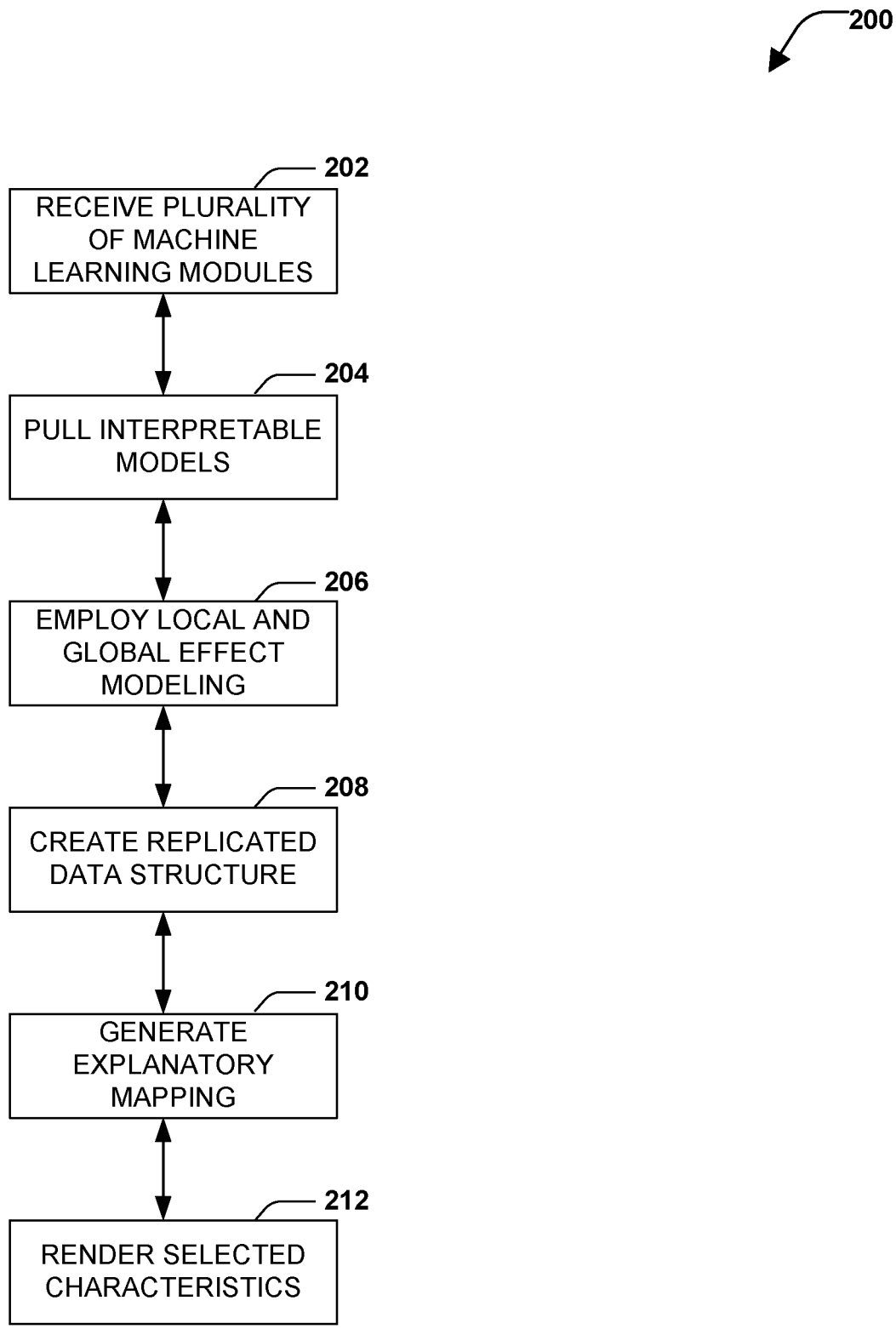
FIG. 2 illustrates an embodiment of a method that resolves opaqueness of complex machine learning applications according to one or more aspects of the disclosure.

Turning now to FIG. 2, illustrated is an example method 200 according to one or more embodiments. It is to be appreciated that details of additional embodiments discussed herein may employ an ordered combination of the steps of example method 200.

At 202, a computing system, such as for example computing system 102 of system 100 may receive a plurality of machine learning modules. It is to be appreciated that the innovation is able to handle a plurality of machine learning applications and that the plurality contains at least one complex machine learning application. Complex machine learning application(s) may be applications developed within computing system 102 or may be third party complex machine learning applications. In some embodiments, the plurality of machine learning applications may comprise a multitude of either or both machine learning applications and complex machine learning applications. In addition to the description herein, those skilled in the art are able to differentiate between a common machine learning application and a 'complex' machine learning application. At step 204 interpretable models are received. These models may be received from an interpretable machine library such as interpretable machine library 106 of system 100, for example. It is to be appreciated that either or receiving or pulling and receiving are contemplated at this step. At 206 local and/or global effect modeling may be employed. Embodiments of this step are reflected in the details discussed herein.

At step 208, creating a replicated data structure is contemplated. This may be completed by a replicator module, for example replicator module 104 of computing system 102. Additional detailed embodiments are discussed herein. At step 210, generating an explanatory mapping may be undertaken. In an embodiment, a translator module, such as for example translator module 116 of computing system 102 may generate an explanatory mapping. Additional embodiments of this step are reflected in the details discussed herein.

Step 212 may render selected characteristics. It is to be appreciated that rendering selected characteristics may be undertaken by a graphical user interface configured as disclosed herein, and may be for example, graphical user interface 120 of computing system 102. It is to be appreciated that while conventional graphical interfaces may provide their conventional capabilities, the innovation here, as an ordered combination, and as configured as disclosed, provides substantially more than conventional computing elements taken individually.

Figure 3:
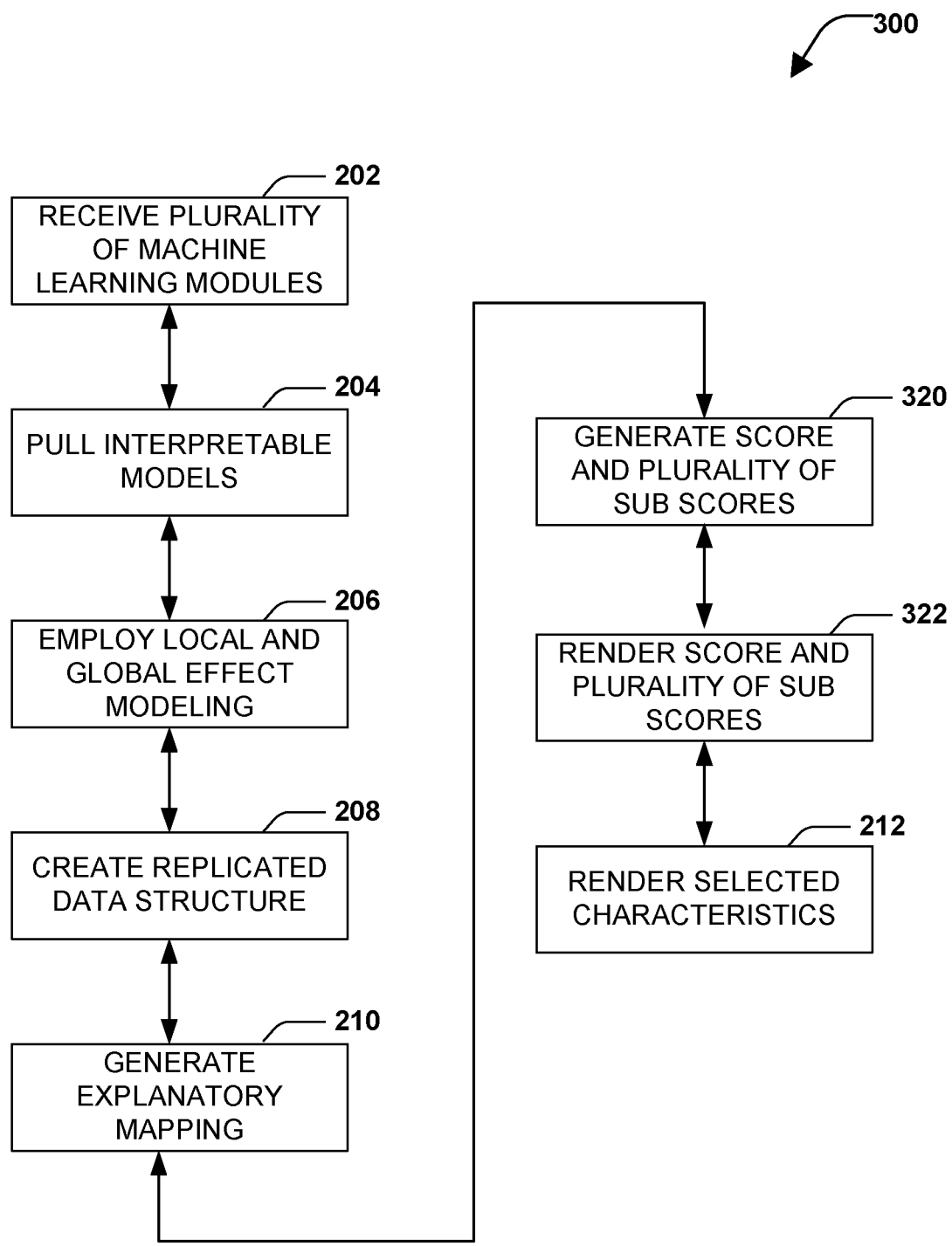
FIG. 3 illustrates an embodiment of a method that resolves opaqueness of complex machine learning applications according to one or more embodiments.

Turning now to FIG. 3, illustrated is an example method 300 according to one or more embodiments. It is to be appreciated that details of additional embodiments discussed herein may employ an ordered combination of the steps of example method 300.

At 202, a computing system, such as for example computing system 102 of system 100 may receive a plurality of machine learning modules. It is to be appreciated that the innovation is able to handle a plurality of machine learning applications and that the plurality contains at least one complex machine learning application. Complex machine learning application(s) may be applications developed within computing system 102 or may be third party complex machine learning applications. In some embodiments, the plurality of machine learning applications may comprise a multitude of either or both machine learning applications and complex machine learning applications. At step 204 interpretable models are received. These models may be received from an interpretable machine library such as interpretable machine library 106 of system 100, for example. It is to be appreciated that either or receiving or pulling and receiving are contemplated at this step. At 206 local and/or global effect modeling may be employed. Embodiments of this step are reflected in the details discussed herein.

At step 208, creating a replicated data structure is contemplated. This may be completed by a replicator module, for example replicator module 104 of computing system 102. Additional detailed embodiments are discussed herein. At step 210, generating an explanatory mapping may be undertaken. In an embodiment, a translator module, such as for example translator module 116 of computing system 102 may generate an explanatory mapping. Additional embodiments of this step are reflected in the details discussed herein.

In some embodiments, generating a score and a plurality of sub scores may occur at step 320. In embodiments, generating a score may be performed by a translator module, for example, translator module 116 of computing system 102. A score may indicate match status to at least one complex machine learning module (or application). A score may rank disparity based at least in part on prime and derivative results of a replicated semi-additive index data structure. Additional details related to such embodiments are disclosed herein.

Additionally in some embodiments, step 320 may include associating and at least one complex machine learning module (application) with a generated score. It is to be appreciated that generating a plurality of sub scores may involve, for a plurality of elements of a replicated semi-additive index date structure (for example semi-additive index data structure 108 of computing system 102), ranking of relative effects of a disparity to the plurality of elements of such a structure.

At step 322, rendering score and plurality of sub scores may occur. It is to be appreciated that some embodiments may include rendering one, the other or both scores and plurality of sub scores. Rendering may be undertaken by a graphical user interface, such as graphical user interface 120 of computing system 102, as disclosed herein.

Step 212 may render selected characteristics. It is to be appreciated that rendering selected characteristics may be undertaken by a graphical user interface configured as disclosed herein, and may be for example, graphical user interface 120 of computing system 102. It is to be appreciated that while conventional graphical interfaces may provide their conventional capabilities, the innovation here, as an ordered combination, and as configured as disclosed, provides substantially more than conventional computing elements taken individually.

While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 4:
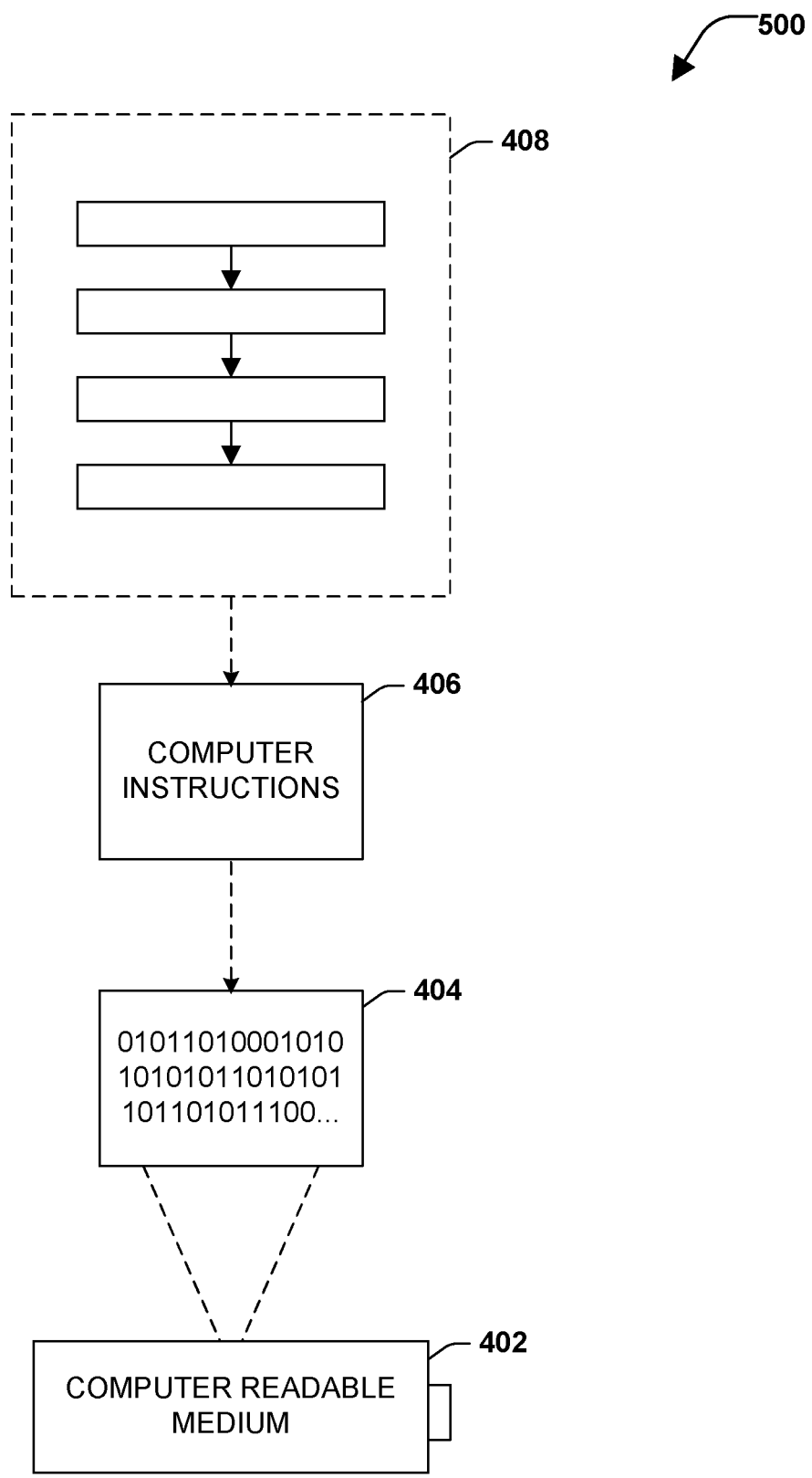
FIG. 4 is an illustration of an example computing environment where one or more of the provisions set forth herein can be implemented, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 4, wherein an implementation 400 includes a computer-readable medium 402, such as a CD-R, Digital Versatile Disk (DVD-R), flash drive, a platter of a hard disk drive, etc., on which is encoded computer-readable data 404. This computer-readable data 404, such as binary data including a plurality of zero's and one's as shown in 404, in turn includes a set of computer instructions 406 configured to operate according to one or more of the principles set forth herein. In one such embodiment 400, the processor-executable computer instructions 406 may be configured to perform a method, such as the method 200 of FIG. 2 or method 300 of FIG. 3. In another embodiment, the processor-executable instructions 406 may be configured to implement a system, such as the system 420 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. The disclosed innovation is contemplated to be provided in other implementations (for example, as a dedicated hardware ASICS). Of course, many modifications may be made to this configuration without departing from the scope or spirit of the claimed subject matter.

Figure 5:
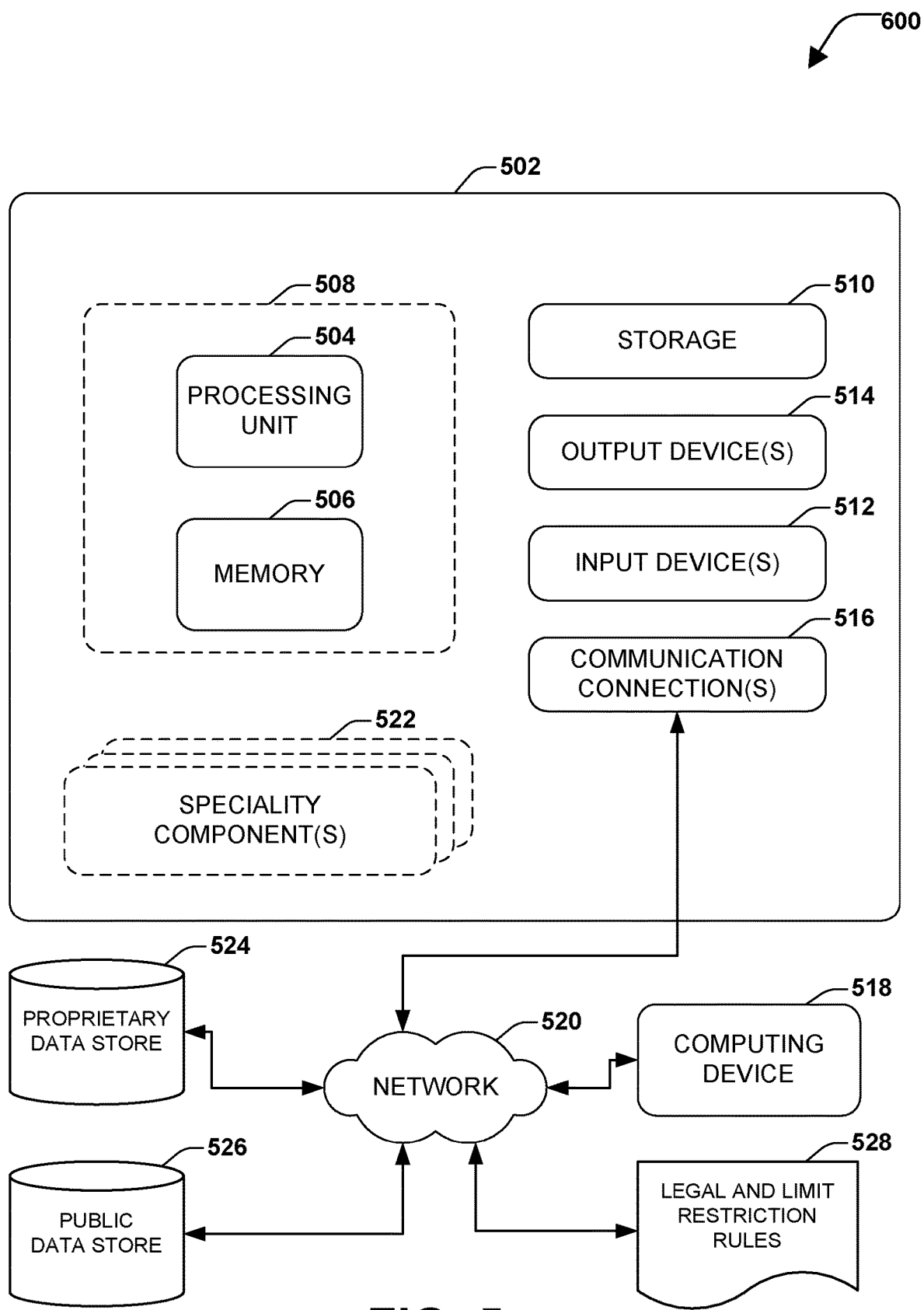
FIG. 5 is an illustration of an example computing environment where one or more of the provisions set forth herein can be implemented, according to one or more embodiments.

FIG. 5 and the following discussion provide a description of a suitable computing environment to implement embodiments of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 502 configured to implement one or more embodiments provided herein. In one configuration, computing device 502 includes at least one processing unit 504 and memory 506. Depending on the exact configuration and type of computing device, memory 506 may be volatile, such as RAM, non-volatile, such as ROM, flash memory, etc., or a combination of the two. This configuration is illustrated in FIG. 5 by dashed line 508.

In other embodiments, device 502 includes additional features or functionality. For example, device 502 may include additional storage such as removable storage or non-removable storage, including, but not limited to, magnetic storage, optical storage, etc. Such additional storage is illustrated in FIG. 5 by storage 510. In one or more embodiments, computer readable instructions to implement one or more embodiments provided herein are in storage 510. Storage 510 may store other computer readable instructions to implement an operating system, an application program, etc. Computer readable instructions may be loaded in memory 506 for execution by processing unit 504, for example.

The term "computer readable media" as used herein includes computer storage media. Computer storage media includes volatile and nonvolatile, removable and non-removable media implemented in any method or technology for storage of information such as computer readable instructions or other data. Memory 506 and storage 510 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 502. Any such computer storage media is part of device 502.

Device 502 includes input device(s) 512 such as keyboard, mouse, pen, voice input device, touch input device, infrared cameras, video input devices, or any other input device. Output device(s) 514 such as one or more displays, speakers, printers, or any other output device may be included with device 502. Input device(s) 512 and output device(s) 514 may be connected to device 502 via a wired connection, wireless connection, or any combination thereof. In one or more embodiments, an input device or an output device from another computing device may be used as input device(s) 512 or output device(s) 514 for computing device 502. Device 502 may include communication connection(s) 516 to facilitate communications with one or more other devices 518, and such communication may occur over a network, for example network 520. [from 209: Additionally, modules or components may be provided that are specialty components 522, for example, as may be seen in FIG. 1, replicator module 104, and translator module 116 are examples of specialty components 522. Specialty components 522 may be configured, for example, in order to transform data structures in a particular manner, or for another example, specialty components 522 may enable machine learning processes to interact with data sets. Other specialty components 522 may be configured to provide interactions with users in either a bulk or batch mode, or in an interactive setting.

Additional Embodiments and Disclosure

The following discussion is provided to give additional context to the innovation's feature, functions and benefits. As such, it is to be understood that the aforementioned system components and methodologies can employ the details that follow.

A type of complex machine learning deals with Supervised Machine Learning "SML." SML applications may include such as Gradient Boosting "GB", Random Forest "RF", and Neural Networks "NN", and are recognized for their increased predictive performance. This is especially true with large data sets (millions or more observations and hundreds to thousands of predictors). However, the complexity of the SML models makes them opaque and hard to interpret on their own. Embodiments herein disclosed include innovative global and local diagnostics for interpreting (or replicating) and providing an ability to create and translate an explanatory mapping of complex machine learning applications, including SML models. This innovation contrasts with traditional or conventional Locally Interpretable Models and Effects "LIME" and K-means partitioning "KLIME" approaches. LIME-SUP may instead be based on fitting trees to the fitted response (LIM-SUP-R) as well as the derivatives of the fitted response (LIME-SUP-D).

Technical improvements in regards to replicated structures Use of these technical embodiments may be more immediately beneficial in certain environments, such as banking and finance which are regulated, and where such model interpretation may play a more important role in dealing with those industries. While some examples and discussion of embodiments may be drawn to those industries for simplicity in explanation, it is to be appreciated that the innovation is not limited to a particular technical environment in the sense of one industry or another. It is to be appreciated that the innovation instead provides a technical improvement due to the technical nature itself.

It is to be appreciated in the integrated local and global effect modeling of this innovation that both global diagnostic and local diagnostic techniques are leveraged. Global diagnostics may be aimed at interpreting an overall relationship between input variables and response variable (over an entire model space). On the other hand, local diagnostics may be aimed at understanding interactions in smaller, local regions, with a possible aim of replicating (or fitting) a simple parametric model may be used to approximate the input-output relationship. While inferior and limited in operation, perhaps the most well-known locally interpretable model currently is LIME. KLIME, a variant of LIME, has been proposed for a purpose to expand fitting locally interpretable models on an entire input space. KLIME partitions the input space into K partitions using clustering techniques (typically K-means) and then fits local models within each cluster. The value of K is chosen so that the predictions from all the local models will maximize. However, this method relies on unsupervised partitioning, and can be unstable, yielding different partitions with different initial locations. Additionally, unsupervised partitioning may not incorporate underlying model information which may impact preserving the underlying model structure. K-means partitions the input space according to Voronoi diagrams, which may have limits in various applications.

In contrast, the disclosed innovation uses supervised partitioning (tree algorithms) and then fits a local model. In other words, fitting local models to both a fitted response (LIME-SUP-R) and fitted derivatives (LIME-SUP-D).

In a LIME-SUP-R approach, parametric model-based trees may be fitted both to decide on partitions and to fit a local model within each partition. It is to be appreciated that if a parametric model is a good fit in a given region, no further partitioning need be required. In a LIME-SUP-D approach, piecewise constant trees may be fitted as more of a focus on determining when the partial derivatives change is taken. In some embodiments, model based trees may be fit to the derivatives as well.

LIME-SUP Methodology—LIME-SUP-R Based on Model-Based Trees

In an embodiment, an original dataset for a SML algorithm may be partitioned into three: i) training; ii) validation; and iii) testing. Local models are also developed, validated and their performances assessed on these three data sets respectively.

An embodiment of LIME-SUP-R may works as follows:

Let $\{X_{1i}, \ldots, X_{ki}, i=1, \ldots N\}$ be the set of predictor (independent) variables used to train the original SML algorithm, where N is the number of training dataset observations. These will be used for partitioning and model fitting for the trees. In some cases, there may be separate sets of variables $\{X_1, \ldots X_k\}$ for modeling and $\{Z_1, \ldots Z_l\}$ for partitioning, and these may present alternate embodiments to pursue for subsets of all variables.

Let $\{\hat{Y}_i, i=1, \ldots, N\}$ be the fitted responses from an SML application (or algorithm) which will be used in the supervised partitioning applications (or algorithm). It is to be appreciated that "algorithm" may be used for ease of explanation, given the applied mathematics involved in some of the details, and that algorithm may be used interchangeably with "application." As such, the sense of "algorithm" is not to be taken in a strict "math" sense.

It is to be appreciated that this step may apply to either or both of continuous and binary responses. The innovation disclosed is robust and handles one, the other, or both. For continuous response, they are the fitted responses, and for binary response, they will be predicted probabilities or logics of the fitted probabilities.

For a specified class of parametric model (say for example, linear regression model with no interactions), a model-based tree may be fitted to the responses and predictors in a training dataset. Specifically, an overall parametric model (from the specified class) may be fitted at a root node to the (fitted SML) responses and predictors. A best split to partition the root node into two child nodes may then be found. This may be done by (again) fitting the same class of parametric models to all possible pairs of child nodes and determining the "best" partition. This may involve searching over all partitioning variables and possible splits within each variable and optimizing a specified fit criterion such as mean square error ("MSE") or deviance. Until a specified stop criterion is met, splitting may continue. Specified stop criteria may include, for example, max depth, minimum number of observations in the child node, or satisfactory fit. A resultant tree may then be pruned back the tree using a selected model fit statistics such as $R^2$, improvement in $R^2$, improvement in sum squared error "SSE," and the like, on the validation dataset. After pruning, a regularized regression algorithm (such as Least Absolute Shrinkage and Selection Operator "LASSO") may be used to fit a sparse version of the parametric model at each node. It is to be appreciated that using regularized models during a tree-building phase may tend to be time consuming.

It is to be appreciated that finding a best partition may use multiple approaches in multiple embodiments. An approach may be to exhaustively search all combinations of partitioning variables and candidate split points (e.g., percentiles). Another approach may be to apply an M-Fluctuation test, which is a fast algorithm to select the best partitioning variables, although this approach may not always pick the variable that minimizes an SSE. An approach is a Hybrid M-Fluctuation approach. M-Fluctuation test may be used as a filtering step and then exhaustive search may be applied for the top few variables.

LIME-SUP Methodology—LIME-SUP-D

An approach to LIME-SUP-D may be similar to LIME-SUP-R but with several differences. A response(s) for a tree algorithm may be based on first partial derivatives of fitted responses (from SML algorithms). For example, $$\left\{\frac{\partial \hat{Y}_i}{\partial x_k}, i = 1, \ldots, N; k = 1, \ldots, K\right\}$$

instead of fitted responses such as $\{\hat{Y}_i, i=1, \ldots, N\}$. Derivatives may be scaled appropriately before applying the step. In an embodiment, before splitting at each node, standard deviations of each independent variable may be computed and corresponding partial derivatives multiplied by these standard deviations. For example, let $SD_k$=std. dev$\{X_{k1}, \ldots, X_{KN}\}$. Partial derivatives may then be $$\left\{S\left(\frac{\partial \hat{Y}_i}{\partial x_k}\right) = \frac{\partial \hat{Y}_i}{\partial x_k} \times SD_k, i = 1, \ldots N, k = 1, \ldots, K\right\},$$

and these may be used as a N×K matrix of responses.

Embodiments may vary in different ways to fit a multivariate response to independent variables. For example, multivariate regression techniques may be used to fit a model to a N×K matrix of responses; or N responses for all K variables may be stacked into a single vector, a matrix of predictor variables may be repeated K times and may be treated as a single regression application. In some embodiments, a model fit to a N×K matrix may be modified to treat columns as independent.

In another embodiment, a class of parametric models for LIME-SUP-D may correspond to be one-order lower than those considered for LIME-SUP-R since derivatives are being modeled. For example, if we consider fitting linear regression models for LIME-SUP-R, then a piecewise constant tree may be fitted to each node, since a derivative corresponds to coefficients of the liner regression model. It is to be appreciated that fitted model within each node may be used to obtain predicted values. For embodiments fitting a piecewise constant tree within each node, a fitted value will be the average of all the observations within each node. Derivatives may be readily available for NNs through back propagation. Finite differences may be used to approximate the derivatives from a fitted response surface for some machine learning applications such as GBM and RF. In other embodiments a Neural Net surrogate model may be fitted to responses of GBM and RF and derivatives from the Neural Net obtained.

The innovation introduces two classes of locally interpretable models and effects based on supervised partitioning: i) LIME-SUP-R and ii) LIME-SUP-D. Investigations show that both classes perform better than KLIME methods. Further, LIME-SUP-R has better performance in terms of predictive accuracy and interpretability.

It is to be appreciated that LIME-SUP provides advantages over KLIME methods. Supervised partitioning leads to the use of the underlying model structure in developing the partitions, and approximates original models better, thus may lead to more meaningful partitions. For example, processing economy may be realized since for underlying local model that are linear, LIME-SUP will not split the node further. LIME-SUP may capture most any nonlinearity or interactions through partitioning, and splits may be optimized to capture accurately where nonlinearity or interactions occur, providing interpretability. Higher-order local models that can incorporate quadratic nonlinear effects and simple interactions directly are supported. Supervised partitioning leads to more stable trees. Tree structure is easy to understand; its hierarchical structure lays out the most important, second most important segmentation feature, and the like. Further, upper level tree nodes offer a semi-global level interpretation, and provide a model segmentation scheme with a small number of segments. It is to be appreciated that for applications on global rather than local effects, less noise may be provided, increasing stability of the trees and may alleviate overfitting, even for deeper trees.

The disclosed innovation shows various selected characteristics of explanatory mapping or semi-additive index data structures that from global effect models (for example, Partial dependence plots "PDPs", marginal plots and as accumulated local effects "ALE" plots may be unified under a derivative-based approach, and may be leveraged. In particular, the disclosed innovation shows that marginal plots are equivalent to ATDEV plots, a set of newly proposed derivative-based plots from the summation of ALE plots for "direct effects" and other plots termed as accumulated local transferred effects "ATE" plots for "indirect effects".

Selected characteristics that may be generated into a subset of visual representations of a semi-additive index data structure related to explanatory mapping may include a suite of a matrix plot and a heat maps to visualize the decomposition of ATDEV plots (or marginal plots) into ALE and ATE plots, and create measures of each component that add up to total variable importance for variable selection. Based on conditional distributions, the disclosed innovative derivative interpretation tools are most all free of extrapolation risk. The data structure is also much more computationally effective compared with PDPs.

The disclosed innovation may provide an ability to interpret specific machine learning fitting response surfaces and relationships with covariates. Different complex machine learning algorithms may have different interpretation on the relationship between response and covariates, which may not be consistent with a true item being modeled. For example, with highly correlated inputs, different algorithms may have different allocation of the explanation power among the correlated inputs, but still have very similar final predictions. With the disclosed innovation, ATDEV plots and marginal plots may show very similar shapes from different algorithms for a certain variable, and which may account for an overall effect including dependence of other correlated variables. ALE and ATE plots may show how different algorithms allocate explanation power among the correlated inputs. Thus, the disclosed innovation facilitates resolution of "identifiability" concerns for collinearity for the parametric model.

It is to be appreciated that terminology in the following explanation is used for ease of explication and is not an indication that "math" is being claimed as the innovation.

Relationships Among PDP, Marginal and ALE Plots

Let $f(x_1, \ldots x_p)$ be the fitted function of interest from some algorithms with p-dimensional input. Recall the definitions of 1D-PDP, 1D-Marginal and 1D-ALE for $x_j$:

$$f_{PDP}^{(1)}(x_j) = E_{\backslash X_j}\{f(x_j, \backslash X_j)\},$$

$$f_M^{(1)}(x_j) = E_{\backslash X_j | X_j}\{f(X_j, \backslash X_j) | X_j = x_j\},$$

$$f_{ALE}^{(1)}(x_j) = \int_{z_{j,0}}^{x_j} E_{\backslash X_j | X_j}\{f^1(X_j, \backslash X_j) | X_j = z_j\}dz_j$$

Here, $\backslash x_j = (x_1, \ldots, x_{j-1}, x_{j+1}, \ldots, x_p)$ represents the (p−1) dim input vector without $x_j$, and $$f^1(x_j, \backslash x_j) \triangleq \frac{\partial f(x_j, \backslash x_j)}{\partial x_j}$$

is the 1st order partial derivative of f(.) with respect to $x_j$.

From the above definitions $f_{ALE}^{(1)}(x_j)$ is the only one based on derivatives. Later PDP and Marginal plots are shown as being able to be written in the derivative-based forms and are intrinsically connected to ALE. We first show the relationship among the three plots for independent data.

Proposition 1

For independent data, PDPs, Marginal plots and ALE plots are equivalent up to constant difference.

Explication $$f_M^{(1)}(x_j) = E_{\backslash X_j | X_j}\{f(X_j, \backslash X_j) | X_j = x_j\} = E_{\backslash X_j}\{f(X_j, \backslash X_j)\} = f_{PDP}^{(1)}(x_j),$$

$$f_{ALE}^{(1)}(x_j) = \int_{x_{j,0}}^{x_j} E_{\backslash X_j | X_j}\{f^1(X_j, \backslash X_j) | X_j = z_j\}dz_j =$$

$$\int_{z_{j,0}}^{x_j} E_{\backslash X_j}\{f^1(z_j, \backslash X_j)\}dz_j = E_{\backslash X_j}\left\{\int_{z_{j,0}}^{x_j} f^1(z_j, \backslash X_j)dz_j\right\} =$$

$$E_{\backslash X_j}\{f(X_j, \backslash X_j) + C(\backslash X_j)\} = E_{\backslash X_j}\{f(X_j, \backslash X_j)\} + C = f_{PDP}^{(1)}(x_j) + C,$$

where $C(\backslash X_j)$ is a function of $\backslash X_j$, and $C=E_{\backslash x_j}\{C(\backslash X_j)\}$ is a constant.

In practice, independence assumption may be too strong to hold for real-world data, especially when the data is trained with black box algorithms without variable selection. Although correlation is usually not a concern for model prediction, it poses great challenges to model interpretation and inference. In conventional regression models, it is well known that large correlation or multicollinearity can cause instable parameter estimation which makes the statistical inference unreliable. The same is true for black box supervised algorithms. What makes it worse for black box algorithms is that although different methods such as virtual interface "VIF" diagnostics, filtering and variable selection are usually applied before building regression models to rule out highly correlated variables, similar dimension reduction techniques for black box algorithms, whose primary goal is to improve prediction performance with large number of inputs, are seldom applied. When data are correlated, there are 2 major complications that may impact existing black box diagnostic tools:

1. Certain areas of the sample space can be sparse or even empty with highly correlated variables. In such cases, permutation tests and PDP calculations are biased due to extrapolation issue.

2. Due to correlation, 1st order effect of a certain variable can come from itself (i.e., the main effect), the main effects of other variables correlated with it, and the interactions between it and its correlated variables. There is no clean decomposition of the total effect into main effect and interaction effect because the impact from other variables through correlation is confounded with both. In such cases, the analysis of variance "ANOVA"-decomposition is no longer available.

It is to be appreciated that variables may be continuous or binary. In correlated cases, let's first assume all the variables are continuous and focus on variable $x_j$. Binary variables will be discussed later. Assume that for any $x_i \in \backslash x_j$, its dependency on $x_j$ can be modeled through the following form $x_i = h_i(x_j) + e_i$, where $e_i$ is random noise with 0 mean and independent of $x_j$.

Recall the definition of first order "total derivative":

$$f^{T1}(x_j, \backslash x_j) = \frac{df(x_j, \backslash x_j)}{dx_j} =$$

$$\frac{\partial f(x_j, \backslash x_j)}{\partial x_j} + \sum_{i \neq j} \frac{\partial f(x_j, \backslash x_j)}{\partial x_i}\frac{dx_i}{dx_j} \triangleq f^1(x_j, \backslash x_j) + \sum_{i \neq j} f^1(x_i, \backslash x_i)\frac{dh_i(x_j)}{dx_j}$$

Note that the partial derivative $f^1(x_j, \backslash x_j)$ used to formulate ALE is part of $f^{T1}(x_j, \backslash x_j)$.

The 1st order Accumulated Total Derivatives Effects (ATDEV) of $x_j$ are defined by taking conditional expectation of $f^{T1}(X_j, \backslash X_j)$ given $X_j = z_j$ and integrate over $z_j$:

$$f_{Tot}^{(1)}(x_j) = \int_{z_{jn}}^{x_j} E_{\backslash X_j | X_j}\{f^{T1}(z_j, \backslash X_j) | X_j = z_j\}dz_j = \quad \text{Eq}(1)$$

$$\int_{z_{j,0}}^{x_j} E_{\backslash X_j | X_j}\{f^1(X_j, \backslash X_j) | X_j = z_j\}dz_j +$$

$$\int_{z_{j,0}}^{x_j} E_{\backslash X_j | X_j}\left\{f^1(X_i, \backslash X_i)\frac{dh_i(X_j)}{dX_j} \bigg| X_j = z_j\right\}dz_j$$

Note that the first part on the RHS of Eq (1) is 1D ALE, $f_{ALE}^{(1)}(x_j)$, and in the second part, for the $i^{th}$ component in the summation, let $$f_i^{(1)}(x_j) \triangleq \int_{z_{j,0}}^{x_j} E_{\backslash X_j | X_j}\left\{f^1(X_i, \backslash X_i)\frac{dh_i(X_j)}{dX_j} \bigg| X_j = z_j\right\}dz_j \quad 20$$

be the 1D Accumulated Local Transferred Effects (ATE) of $x_j$ through $x_j$.

Therefore, $f_{TOT}^{(1)}(x_j)$ can be written as the summation of ALE and ATE:

$$f_{Tot}^{(1)}(x_j) = f_{ALE}^{(1)}(x_j) + \sum_{i \neq i} f_i^{(1)}(x_j). \quad \text{Eq}(2)$$

The formulation of 1D ATDEV in Eq (2) suggests the total effect of variable $x_j$ is a summation of the effects contributed exclusively by itself, represented by $f_{ALE}^{(1)}(x_j)$, and the mutual effects between itself and other variables which are transferred through other correlated variables, represented by $f_i^{(1)}(x_j)$; for $i \neq j$. Note that $f_i^{(1)}(x_j) = 0$ when $x_i$ is independent of $x_j$, which suggests that $f_{TOT}^{(1)}(x_j)$ will reduce $f_{ALE}^{(1)}(x_j)$ is independent of all the other variables.

Now, let's rewrite $f_{PDP}^{(1)}(x_j)$ and $f_M^{(1)}(x_j)$ in derivative-based forms. For $f_{PDP}^{(1)}(x_j)$, by expressing $f(x_j, \backslash X_j)$ as the sum of the integral of partial derivatives and a function of other variables, and switching the order of double integrals, we have $$f_{PDP}^{(1)}(x_j) = E_{\backslash X_j}\{f(x_j, \backslash X_j)\} = E_{\backslash x_j}\left\{\int_{z_{j,0}}^{x_j} \frac{\partial f(z_j, \backslash x_j)}{dz_j}dz_j + C(\backslash x_j)\right\} = \quad \text{Eq}(3)$$

$$\int_{\backslash x_j}\int_{z_{j,0}}^{x_i} \frac{\partial f(z_j, \backslash x_j)}{\partial z_j}dz_j p(\backslash x_j)d\backslash x_j + C =$$

$$\int_{z_{j,0}}^{x_j}\int_{\backslash x_j} f^1(z_j, \backslash x_j)p(\backslash x_j)d\backslash x_j dz_j + C = \int_{z_{j,0}}^{x_j} E_{\backslash X_j}\{f^1(z_j, \backslash X_j)\}dz_j + C$$

From Eq (3), $f_{PDP}^{(1)}(x_j)$ is similar to $f_{ALE}^{(1)}(x_j)$ in that both of them are based on partial derivative $f^1(x_j, \backslash x_j)$. However, which is $f_{PDP}^{(1)}(x_j)$ which is defined with marginal distribution, $f_{ALE}^{(1)}(x_j)$ is defined with conditional distribution that protects it from the extrapolation issue in correlated cases.

For marginal plots, leveraging a definition of total derivatives provides the following proposition:

Proposition 2

$$f_M^{(1)}(x_j) \equiv f_{Tot}^{(1)}(x_j) + C - \quad \text{Eq}(4)$$

Explication of Proposition 2

Let $x_i = h_i(x_j) + e_i$, where $e_i$ is random noise with 0 mean and independent of $x_j$. Thus $$\backslash x_j = (x_1, \ldots, x_{j-1}, x_{j+1}, \ldots, x_p) = (h_1(x_j) + e_1,$$

$$\ldots, h_{j-1}(x_j) + e_{j-1}, h_{j+1}(x_j) + e_{j+1}, \ldots, h_p(x_j) + e_p) \stackrel{\Delta}{=} h(x_j) + e$$

$$f_M^{(1)}(x_j) = E\{f(X_j, \backslash X_j) | X_j = x_j\} = \int_{\backslash x_j} f(x_j, \backslash x_j)p(\backslash x_j | x_j)d\backslash x_j =$$

$$\int_e f(x_j, h(x_j) + e)p(h(x_j) + e | x_j)de =$$

$$\int_e f(x_j, h(x_j) + e)p(e)de = \int\left(\int_{z_{j,0}}^{x_j} \frac{df(z_j, h(z_j) + e)}{dz_j}dz_j + C\right)p(e)de =$$

$$\int_{z_{j,0}}^{x_j}\int_e \frac{df(z_j, h(z_j) + e)}{dz_j}p(e)dedz_j + C =$$

$$\int_{z_{j,0}}^{x_j} E_e\left\{\frac{df(z_j, h(z_j) + e)}{dz_j}\right\}dz_j + C = \int_{z_{j,0}}^{x_j} E_e\{f^{T1}(z_j, \backslash X_j)\}dz_j + C$$

Similarly, $$f_{Tot}^{(1)}(x_j) =$$

$$\int_{z_{1,0}}^{x_1} E\{f^{T1}(z_j, \backslash X_j) | X_j = z_j\}dz_j = \int_{z_{1,0}}^{x_1}\int_{\backslash x_j} f^{T1}(z_j, \backslash x_j)p(\backslash x_j | z_j)d\backslash x_j dz_j =$$

$$\int_{z_{1,0}}^{x_1}\int_e f^{T1}(z_j, \backslash x_j)p(h(z_j) + e | z_j)dedz_j =$$

$$\int_{z_{1,0}}^{x_1}\int_e f^{T1}(z_j, \backslash x_j)p(e)dedz_j = \int_{z_{1,0}}^{x_1} E_e\{f^{T1}(z_j, \backslash X_j)\}dz_j$$

Therefore, $f_M^{(1)}(x_j) \equiv f_{Tot}^{(1)}(x_j) + C$.

The above proposition implies that $f_M^{(1)}(x_j)$ and $f_{Tot}^{(1)}(x_j)$ takes different paths to measure the same effect. $f_M^{(1)}(x_j)$ directly calculates the averages of the model fits conditional on different values of $x_j$, whereas $f_{Tot}^{(1)}(x_j)$ "detours" by taking derivatives, calculating conditional averages and doing integrations. Both measure the overall effect of $x_j$. However, the extra effort taken by $f_{Tot}^{(1)}(x_j)$ is rewarded by being able to separate ALE and ATE between $x_j$ and each of the other variables in the model.

Proposition 3

For purely additive $f(.)$, $$f_{ALE}^{(1)}(x_j) \equiv f_{PDP}^{(1)}(x_j) + C. \quad \text{Eq (6)}$$

Explication

Let $$f(x_1, \ldots, x_J) = g_1(x_1) + g_2(x_2) + \ldots + g_p(x_J)$$

$$f_{PDP}^{(1)}(x_j) = E_{\backslash X_j}\{g_1(x_1) + g_2(X_2) + \ldots + g_p(X_J)\} = g_1(x_1) + C,$$

$$f_{ALE}^{(1)}(x_j) =$$

$$\int_{z_{j,0}}^{x_j} E\left\{\frac{\partial f(X_j, \backslash X_j)}{\partial X_j} \bigg| X_j = z_j\right\}dz_j = \int_{z_{j,0}}^{x_j} g_j'(z_j)dz_j = g_1(x_1) + C,.$$

Thus, $f_{ALE}^{(1)}(x_j) \equiv f_{PDP}^{(1)}(x_j) + C$.

Note that Eq (6) holds for any purely additive function, regardless of data correlations. However, in the implementation, the equivalence may not be true as we assume $f(x_1, \ldots, x_j)$ is known outside the variable support, and PDP requires extrapolation for f.

Through the formulation of Eq (3)-Eq (5), it is clear that the following can be surmised:
- 1D PDP plots do not address correlation at all
- 1D marginal (or 1D ATDEV) plots address correlations through total derivatives, and represent "total effect" or "overall effect" of a given variable
- 1D ALE plots address correlations through partial derivatives, and account for the exclusive contribution, or "direct effect", of a given variable Computation. Computation complexity may vary across different plots. Computation of marginal plots is the most straightforward among the plots discussed as it does not require any scoring of out-of-sample data or calculating derivative and integrals. In general, marginal plots are always the fastest to generate, and are robust in reflecting in response surface. The computation of PDPs, by comparison, can be quite slow due to specifying grid points and scoring extrapolated data points based on the grid points. The computation of ALE, ATE and ATDEV is complicated but usually faster than PDPs. Such may involves several steps as follows:

1. Calculate partial derivative $f^1(x_j, \backslash x_j)$ for each in-sample data point for given j;
2. Calculate derivatives of $$\frac{dh_i(x_j)}{dx_j}$$

for given i and j;

3. Estimate the conditional expectations in Eq (1);
4. Integrate the averages across $x_j$.

It is to be appreciated that there may be at least two ways to obtain $f^1(x_j, \backslash x_j)$ in step 1, analytically or numerically. The analytical approach may be limited to algorithms with closed-form gradients, for example, Neural Networks, where the gradient functions can be extracted from the fitted algorithm and score new gradients on any give data points. This is accurate and convenient for calculating $f^1(x_j, \backslash x_j)$ for continuous variables. For algorithms without closed-form gradients, e.g., the tree-based algorithms, one may approximate the derivatives with numerical differences.

It is worth mentioning that even when a prediction model itself does not have closed-form gradients, one may fit a NN surrogate model to the prediction model scores, and get model performance comparable to, if not better than, the original prediction models.

In step 2, It is to be appreciated that different ways may be used to specify $h_i(x_j)$. For simplicity, a preferred use is linear regression with ordinary least square "OLS" for $h_i(x_j)$ for non-skewed continuous $x_i$ and logistic regression for binary $x_i$. It is to be appreciated that other manners, such as for example, specify $h_i(x_j)$ with more complicated functional forms using splines or local smoothing, may be used. When $x_i$ is continuous but heavily skewed, special treatment is may be used for robust estimation of $$\frac{dh_i(x_j)}{dx_j}.$$

Derivatives for Binary Variables

Derivative based methods may call for variables to be continuous and response surfaces to be differentiable. Difficulty may be encountered in obtaining derivatives for the jumpy response surface or discrete variables. For the jumpy response surface, building NN surrogate model as a portion of a replication step may help smooth fitted response surfaces and may help generate derivatives. Thus, for binary variables, it is to be appreciated that adjustments may be made. Neural Networks treat binary variables as continuous in model training so that the response surface can be a non-linear function of $x_j$ in theory, and the resulted gradient of $f^1(x_j, \backslash x_j)$ can have different values at $x_j=0$ and $x_j=1$ given that all the other variables are fixed. However, the effect of $x_j$ for most any sample point may be represented by connecting $f(x_j=0, \backslash x_j)$ and $f(x_j=1, \backslash x_j)$ through a straight line with constant derivatives. In order to force $f^1(x_j, \backslash_j)$ to be constant for binary $x_j$ we define $f^1(x_j, \backslash x_j)$ for binary variable through numerical difference:

$$f^1(x_j, \backslash x_j) = f(x_j=1, \backslash x_j) - f(x_j=0, \backslash x_j).$$

It is to be appreciated that limitations exist. First, for Step 1, since each individual only takes one value of 0 and 1 for $x_j$, prediction with the other value requires extrapolation. Secondly, the numerical implementation of integrals discretizes continuous space into finite small intervals. The convergence of the numerical calculation to the theoretical value may call for intervals as small as possible. For continuous variables, having usually M>10 bins to accumulate in the integral calculation in Step 4. Such numerical integration may not be reasonable for the binary variables with only two bins and different average gradients in these two bins. The different gradients suggest the "true" underlying curve is nonlinear between 0 and 1. However no observations may be in the middle. To remediate such issue, linear interpolation may be used between the two average gradient values at 0 and 1, obtain the values of $f_{ALE}^{(1)}(x_j)$ and $f_1^{(1)}(x_j)$ at 0 and 1 by numerical integration as for continuous variables, and connect these two values to generate the straight lines. By taking this approach, linear or quadratic curve between 0 and 1 may be recovered, but may have bias when a true model has higher orders great than two. Nevertheless, this still helps in reducing the accumulation errors with only two bins. In an alternative embodiment, an approach may be to handle binary variables in derivative based diagnostics by creating middle points between 0 and 1 through Monte Carlo simulation.

Visualizations

Based on the disclosed innovation, selected characteristics may be rendered with a graphical user interface, for example, a graphical user interface such as graphical user interface 120 of computing system 102.

ATDEV Plot Matrix

In some embodiments, and for p covariates in a model, a p by p plot matrix may be created, where the subplot in row i and column j displays the centered 1D ATE plot $f_i^{(1)}(x_j) - E\{f_i^{(1)}(x_j)\}$ if i≠j, and displays the centered 1D ALE plot $f_{ALE}^{(1)}(x_j) - E\{f_{ALE}^{(1)}(x_j)\}$ if i=j. In other words, the subplots in column j may represent the effect of $x_j$ on the fitted response through different paths: the diagonal plot (j,j) may represent the contribution of $x_j$ on f(.) "exclusively" from itself, and the off-diagonal plots represent the effect of $x_j$ on f(.) through its correlated variables. The non-zero off-diagonal subplots show two things simultaneously: a) the two corresponding variables are correlated, i.e., $$\frac{dh_i(x_j)}{dx_i} \neq 0,$$

and b) the row variable, or the "mediator", has a non-zero effect on the fitted response, i.e., $f_1(x_i,\backslash x_i) \neq 0$. Note that the shape of the curves in the off-diagonal subplot $f_i^{(1)}(x_j)$ is decided by both $f_i^{(1)}(x_i)$ and $$\frac{dh_i(x_j)}{dx_j}.$$

When $$\frac{dh_i(x_j)}{dx_j}$$

is a constant slope estimated from OLS, thus shape of $f_i^{(1)}(x_j)$ may follow the shape of the diagonal plot for the $f_{ALE}^{(1)}(x_i)$ for the mediator $x_i$.

ATDEV and Marginal Plots Overlay

By adding up the subplots in each column of ATDEV plot matrix, a centered 1D ATDEV plot $f_{Tot}^{(1)}(x_j) - E\{f_{Tot}^{(1)}(x_j)\}$ for each of the p covariates in a model may be obtained. Per the disclosed proposition 2, the result may be consistent with centered 1D marginal plots $f_M^{(1)}(x_j) - E\{f_M^{(1)}(x_j)\}$, j=1, ..., p. As disclosed, the calculation of $f_M^{(1)}(x_j)$ may be simple and straightforward, whereas calculation of $f_{Tot}^{(1)}(x_j)$ may be much more complicated and subject to approximation errors from calculating derivatives and numerical integration, as well as estimation bias of $$\frac{dh_i(x_j)}{dx_j}$$

due to misspecification of $h_i=(x_j)$. Any of these errors may cause the deviation of $f_{Tot}^{(1)}(x_j)$ from $f_M^{(1)}(x_j)$. Creating an overlay of centered 1D ATDEV plot and centered 1D marginal plot for each variable in the model may provide a diagnostic tool that may detect most any possible errors occurring in a calculation of $f_{Tot}^{(1)}(x_j)$.

ATDEV Variance Heat Map

For a subplot (i,j) in the ATDEV plot matrix:

$$v_{ij} = \begin{cases} \text{Var}(f_i^{(1)}(x_j)), & i \neq j \\ \text{Var}(f_{ALE}^{(1)}(x_j)), & i = j \end{cases}$$

may be defined as a score relating measurement of importance of the corresponding effect on the fitted response. Thus each subplot may be represented by a single positive number, and the whole matrix may be visualized through a heat map, where brighter cells indicate higher scored levels of importance.

Adding up $v_{ij}$ of each column, $v_{ij}=\Sigma_{i=1}^P v_{ij}$ may correspond to ATDEV importance of each variable in a model. It is to be appreciated that $v_{.j}$ may not add up to the variance of the marginal plots which accounts for obol indices total sensitivity $v_{.j}$ which can be visualized through bar chart or heat map.

PDPs, Marginal and ALE Plots Overlay

For each covariate in the model, overlays of its 1D PDP, 1D marginal and 1D ALE plots, all centered to remove the differences caused by the constant terms may be created. This may provide the following:

1D marginal curves may be quite different from 1D PDP and 1D ALE as long as there are some correlations in the data. Observation of the overlap of PDP, marginal and ALE curves for a certain variable may indicate variable having little correlation with other variables in the model. The larger the difference between marginal and other two curve, the higher the correlation may be between the targeting variable and other variables.

If marginal plot does not overlap with the other two curves, a good overlap of 1D PDP and ALE plots for a given variable may indicate a variable's major contribution to a model is to be considered additive, and a PDP may not be affected too much by the extrapolation issues in spite of the correlation. On the contrary, if PDP and ALE plots are far from each other, it may suggest either there are interactions between targeting variables and other variables, confounded by correlations, or PDP is contaminated by extrapolations, or both.

The disclosed innovation shows selected characteristics such as PDPs, marginal and ALE may be established through derivative-based approaches. ATDEV plots equivalence to marginal plots, the ability to decompose into ALE and ATE plots to account for variables' individual contributions to the response surface and the effects transferred to one variable through its correlated variables, respectively, have been presented. A suite of visualization tools that facilitate these relations have been provided, which pierce black box effects of correlated variables, provide scores and ability to rank relative importance of each decomposed effect, and also score possible extrapolation of PDPs.

It is to be appreciated that 2D ALE and ATEs may be used to explain the 2-way interactions between two uncorrelated variables, and the interaction between this particular 2-way interaction term and another variable that are correlated with any of these two variables (e.g., 3-way interaction confounded with correlations).

Semi-Additive Index Data Structure

Embodiments centered on discussions of a semi-additive index data structure are disclosed. It is to be appreciated that creating a structure that imposes some constraints on the network architecture and may thereby provide better insights into an underlying model. Structure may be used to generate explanatory mapping that describe the features engineered by the network in terms of linear combinations of the input features and univariate non-linear transformations.

It is to be appreciated that terms such as "interpretable" and "explainable" may be used interchangeably. Explainability as a factor by itself need not be sufficient without considering predictive performance. For instance, a linear model is very explainable but it is likely to have poor performance approximating a complex surface.

Feedforward neural networks may consist of fully connected layers, e.g., output of each node on a particular layer may be used as input for each node on a next layer. By limiting the connections between nodes, we can give a feedforward neural network structure that can be exploited for different purposes. The disclosed innovation provides for a replicator component (or module) that can generate a structured neural network designed to be explainable. In other words, interpretability may be provided for explanatory mapping that may describe the features and nonlinear transformations learned through a generated semi-additive index data structure.

Generally, pure additive index models as known in the art, may provide a flexible framework for approximating complex functions. The disclosed innovation provides an alternative formulation of an additive index model as a replicated structured neural network. The data structure of the disclosed innovation is more robust than a pure additive index model, as it may be applied in situations wherein a pure additive index model may not. The data structure may provide a direct approach for fitting model via gradient-based training methods for neural networks. Thus, the disclosed innovation provides an ability to pierce opacity of complex machine learning applications with built-in interpretation mechanisms as well as automated feature engineering. The architecture may be described as follows.

An embodiment of a modified version of the additive index model may be defined as:

$$f(x) = \mu + \gamma_1 h_1(\beta_1^T x) + \gamma_2 h_2(\beta_1^T x) + \ldots + \gamma_K h_K(\beta_K^T x). \quad (2)$$

Although shift parameter $\mu$ and scale parameters $\gamma_k$'s need not be identifiable, they are useful for the purposes model fitting: selecting an appropriate number of ridge functions through regularization.

Structure May be Designed to Explicitly Learn the Model Given in Equation (2)

It is to be appreciated that a semi-additive index data structure may be discussed as a neural network based formulation of the additive index mode. This may provide some advantages over a traditional approach. An advantage may be training is enabled using mini-batch gradient-based methods, allowing the formulation to easily be trained on datasets that may be too large to fit in memory at the same time. Further, a formulation may allow leverage of the advancements in general processing unit "GPU" computing used to train neural networks in general. A formulation may also allow straightforward computation of partial derivatives of a function learned by replication. For example, learned by a replicator module 104 of computing system 102. This supports the ability to carry out derivative-based analysis techniques without having to rely on finite difference approximations and the difficulties associated with that method.

Regularization and Parsimony

The overall explainability of the network can be enhanced by using an l penalty on both the first and last hidden layers during training. That is, both the projection coefficients ($\beta_j$'s) and the ridge function weights ($\gamma_i$'s) are penalized. When the strength of the penalty is properly tuned, this can produce a parsimonious model that is relatively easily explained.

An l1 penalty on the first hidden layer forces the projection vectors $\beta_i$ to have few non-zero entries, meaning that each subnetwork (and corresponding ridge function) is only applied to a small set of the variables. Similarly, an l1 penalty on the final layer serves to force $\gamma_i$ to zero in situations where fewer subnetworks are needed in the structure than are specified in training.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has, "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. For features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor that employs effect modeling on a plurality of machine learning modules comprising a machine learning module with opacity issues that includes a black box effect, wherein the effect modeling communicates with a library of interpretable machine learning modules to create a replicated semi-additive index data structure, and wherein the black box effect is a non-visible operation, of the machine learning module with opacity issues, that lacks explainability;
   wherein the effect modeling, by the processor, employs at least an integrated approach of Locally Interpretable Models and Effects based on Supervised Partitioning Fitted Response (LIME-SUPR) and Locally Interpretable Models and Effects based on Supervised Partitioning Derivatives of Fitted Response (LIME-SUP-D);
   a processor that generates explanatory mapping of inputs to the plurality of machine learning modules to results of the plurality of machine learning modules that include the black box effect of the machine learning module with opacity issues;

a graphical user interface that renders selected characteristics of the data structure related to the explanatory mapping to provide the explainability for the black box effect of the machine learning module with opacity issues.

2. The computing system of claim 1, wherein the approach of LIME-SUP-R is applied to continuous and binary responses.

3. The computing system of claim 2, wherein the approach of LIME-SUP-D is applied to continuous and binary responses.

4. The computing system of claim 1, wherein the replicated semi-additive index data structure comprises transformed data structures related to the library of interpretable machine learning modules.

5. The computing system of claim 4, wherein the processor generates a score that indicates match status to the machine learning module with opacity issues, wherein the score ranks disparity based at least in part on prime and derivative results of the replicated semi-additive index data structure.

6. The computing system of claim 1, wherein the graphical user interface renders at least a subset of visual representations of the data structure related to the explanatory mapping, and wherein the subset of visual representations comprises at least one of an accumulated total derivative effects (ATDEV) plot and a heat map.

7. The computing system of claim 1, wherein the replicated semi-additive index data structure is constructed using gradient-based training methods for neural networks by applying neural network based formulation to an additive index model.

8. The computing system of claim 7, wherein construction of the replicated semi-additive index data structure comprises using derivative-based analysis techniques used by the additive index model without having to rely on finite difference approximations.

9. A method comprising:
   employing effect modeling, by a processor, on a plurality of machine learning modules comprising a machine learning module with opacity issues that includes a black box effect, wherein the employing comprises communicating with a library of interpretable machine learning modules to create a replicated semi-additive index data structure, and wherein the black box effect is a non-visible operation, of the machine learning module with opacity issues, that lacks explainability;
   employing the effect modeling comprises employing at least an integrated approach of Locally Interpretable Models and Effects based on Supervised Partitioning Fitted Response (LIME-SUP-R) and Locally Interpretable Models and Effects based on Supervised Partitioning Derivatives of Fitted Response (LIME-SUP-D);
   generating explanatory mapping, by a processor, of inputs to the plurality of machine learning modules to results of the plurality of machine learning modules that include the black box effect of the machine learning module with opacity issues; and
   rendering, by a graphical user interface, selected characteristics of the data structure related to the explanatory mapping to provide the explainability for the black box effect of the machine learning module with opacity issues.

10. The method of claim 9, wherein the approach of LIME-SUP-R is applied to continuous and binary responses.

11. The method of claim 9, wherein the approach of LIME-SUP-D is applied to continuous and binary responses.

12. The method of claim 9, wherein the creating the replicated semi-additive index data structure comprises transforming data structures related to the library of interpretable machine learning modules.

13. The method of claim 12, further comprising generating, by the processor, a score that indicates match status to machine learning module with opacity issues, wherein the score ranks disparity based at least in part on prime and derivative results of the replicated semi-additive index data structure.

14. The method of claim 13, further comprising associating the machine learning module with opacity issues with the generated score, generating a plurality of sub scores for a plurality of elements of the replicated semi-additive index date structure that provide ranking of relative effects of the disparity to the plurality of elements; and
   rendering the score and the plurality of sub scores, by the graphical user interface.

15. The method of claim 9, further comprising rendering, by the graphical user interface, at least a subset of visual representations of the data structure related to the explanatory mapping.

16. The method of claim 15, wherein the subset of visual representations comprises at least one of an accumulated total derivative effects (ATDEV) plot and a heat map.

17. A non-transitory computer readable medium (CRM) having instructions to control one or more processors configured to:
   employ effect modeling on a plurality of machine learning modules comprising a machine learning module with opacity issues that includes a black box effect, wherein the employing comprises communicating with a library of interpretable machine learning modules to create a replicated semi-additive index data structure, and wherein the black box effect is a non-visible operation, of the machine learning module with opacity issues, that lacks explainability;
   wherein employing the effect modeling comprises employing at least an integrated approach of Locally Interpretable Models and Effects based on Supervised Partitioning Fitted Response (LIME-SUP-R) and Locally Interpretable Models and Effects based on Supervised Partitioning Derivatives of Fitted Response (LIME-SUP-D);
   generate explanatory mapping, of inputs to the plurality of machine learning modules to results of the plurality of machine learning modules that include the black box effect of the machine learning module with opacity issues; and
   render selected characteristics of the data structure related to the explanatory mapping to provide the explainability for the black box effect of the machine learning module with opacity issues.

18. The non-transitory (CRM) of claim 17 (as mentioned above), wherein the one or more processors are further configured to:
   generate a score that indicates match status to the machine learning module with opacity issues, wherein the score ranks disparity based at least in part on prime and derivative results of the replicated semi-additive index data structure,
   associate the machine learning module with opacity issues with the generated score,
   render the score; and identify the score to the associated machine learning module with opacity issues; and wherein the creating the replicated semi-additive index data structure comprises transforming data structures related to the library of interpretable machine learning modules.

\* \* \* \* \*